United States Patent
Chien et al.

(10) Patent No.: US 7,456,622 B2
(45) Date of Patent: Nov. 25, 2008

(54) CIRCUIT FOR STARTING UP A SYNCHRONOUS STEP-UP DC/DC CONVERTER AND THE METHOD THEREOF

(75) Inventors: Mao Chuan Chien, Hsinchu (TW); Chu Yu Chu, Hsinchu (TW); Yu Min Sun, Hsinchu (TW)

(73) Assignee: Advanced Analog Technology, Inc., Taiwan (CN)

( * ) Notice: Subject to any disclaimer, the term of this patent is extended or adjusted under 35 U.S.C. 154(b) by 108 days.

(21) Appl. No.: 11/783,564

(22) Filed: Apr. 10, 2007

(65) Prior Publication Data

US 2008/0224673 A1    Sep. 18, 2008

(30) Foreign Application Priority Data

Mar. 14, 2007  (TW) .............................. 96108690 A

(51) Int. Cl.
 *G05F 1/575* (2006.01)
 *G05F 1/618* (2006.01)
(52) U.S. Cl. ....................... 323/284; 323/224
(58) Field of Classification Search .................. 323/222, 323/223, 224, 265, 282, 284, 285, 351
 See application file for complete search history.

(56) References Cited

U.S. PATENT DOCUMENTS

| | | | |
|---|---|---|---|
| 5,233,508 A * | 8/1993 | Yamamura et al. | 363/49 |
| 5,808,884 A * | 9/1998 | Teggatz et al. | 363/98 |
| 6,310,466 B1 * | 10/2001 | Criscione | 323/222 |
| 7,084,611 B2 * | 8/2006 | Kirchner et al. | 323/222 |
| 7,123,494 B2 * | 10/2006 | Turchi | 363/89 |
| 7,330,019 B1 * | 2/2008 | Bennett | 323/282 |

* cited by examiner

*Primary Examiner*—Gary L Laxton
(74) *Attorney, Agent, or Firm*—Oliff & Berridge, PLLC

(57) ABSTRACT

The low voltage circuit for starting up a synchronous step-up DC/DC converter, which connects to a voltage source through an inductor, includes a P-type power transistor, an N-type power transistor and a controller. The P-type power transistor includes a body diode, and one end of the P-type power transistor acts as a power source of an oscillator. The N-type power transistor connects the P-type power transistor in series, and both of the power transistors are not enabled at the same time. The oscillator electrically connects to the controller, which enables the P-type power transistor at initialization time, and enables the N-type power transistor a period after the initialization time.

11 Claims, 4 Drawing Sheets

CIRCUIT FOR STARTING UP A SYNCHRONOUS STEP-UP DC/DC CONVERTER AND THE METHOD THEREOF

BACKGROUND OF THE INVENTION

1. Field of the Invention

The present invention relates to a circuit for starting up a step-up DC/DC converter, and more particularly, to a circuit and method for starting up a synchronous step-up DC/DC converter.

2. Description of the Related Art

FIG. 1 shows a prior art circuit for starting up a step-up DC/DC converter, which is powered by a system voltage source $V_{IN}$, such as 1.2 volts of a battery, which is also provided as power for an analog IC 10 containing an N-type power transistor. When the system voltage source $V_{IN}$ is started in a low voltage state, such as lower than 0.9 volt, in the absence of a feedback control for an oscillator, the output voltage $V_{OUT}$ will quickly increase until divergence. FIG. 2 is another prior art circuit for starting up a step-up DC/DC converter, which feeds back the output voltage $V_{OUT}$ as the voltage source of the analog IC 20 containing the N-type power transistor in order to avoid the power divergence mentioned above. Because one end LX of the inductor connects to the output end $V_{OUT}$ of the step-up DC/DC converter through a zenor diode, even though the system voltage source $V_{IN}$ is only 0.8 volt, through about 0.1 volt of the conductance voltage of the zenor diode, the output voltage $V_{OUT}$ of the step-up DC/DC converter still stays at about 0.7 volt so that the analog IC 20 would smoothly start up. However, the prior art circuit in FIG. 2 needs an additional zenor diode, which causes additional cost and waste of die size.

In addition, the above two prior art circuits belong to non-synchronous circuits rather than synchronous circuits with non-overlapping phases. Therefore they do not satisfy the current design trend.

FIG. 3 shows a prior circuit for starting up a synchronous step-up DC/DC converter. The circuit 30 is powered by a voltage source $V_{IN}$ through an inductor L1. The P-type power transistor 32 includes a parasitic diode 33, one end of which connects to the output end $V_{OUT}$ of the step-up DC/DC converter, which acts as the power input of the oscillator. As far as the parasitic diode 33 is concerned, the more area the P-type power transistor 32 uses, the less conductance voltage of the parasitic diode 33 there is. However, the larger area of the P-type power transistor 32 will unduly increase the die size of the entire chip. To balance the above two factors, usually the conductance voltage of the parasitic diode 33 will be controlled between 0.3 volt and 0.4 volt. However, at this time, to achieve the purpose of starting up the entire circuit, the voltage source $V_{IN}$ needs to reach up to 1 to 1.1 volts. For many applications, the system voltage $V_{IN}$ is usually required to start up a circuit, even though it is only at 0.9 volt. Therefore the prior art circuit is still unqualified for the demand of the market.

SUMMARY OF THE INVENTION

The circuit and method of the present invention is to use a synchronous design to solve a low-voltage start-up problem of a DC/DC converter.

The circuit for starting up a synchronous step-up DC/DC converter according to an embodiment of the present invention includes a P-type power transistor, an N-type power transistor and a controller. The P-type power transistor includes a parasitic diode, and one end of the P-type power transistor provides an oscillator with power. The N-type power transistor connects to the P-type power transistor. The controller electrically connects to the oscillator, and the controller includes a delay unit and a logic unit. The logic unit disables the N-type power transistor and enables the P-type power transistor upon start-up, and the delay unit disables the P-type power transistor and enables the N-type power transistor in a period after start-up.

The circuit for starting up a synchronous step-up DC/DC converter according to an embodiment of the present invention includes a P-type power transistor, an N-type power transistor and a controller. The P-type power transistor includes a parasitic diode, and one end of the P-type power transistor provides an oscillator with power. The N-type power transistor connects to the P-type power transistor. The P-type and N-type power transistors are enabled separately at non-overlapping times. The controller electrically connects to the oscillator, enables the P-type power transistor upon start-up and enables the N-type power transistor in a period after start-up.

The method for starting up a synchronous step-up DC/DC converter according to an embodiment of the present invention includes the step of providing a P-type and N-type power transistor connected to each other, where the P-type and N-type power transistors connect to a voltage source through an inductor, and one end of the P-type power transistor provides an oscillator with power. Thereafter, a low start-up voltage is inputted to the voltage source to enable the oscillator through the P-type power transistor. Next, the P-type power transistor is disabled first and then the N-type power transistor is enabled after the oscillator has operated for a period.

BRIEF DESCRIPTION OF THE DRAWINGS

The invention will be described according to the appended drawings in which.

PREFERRED EMBODIMENT OF THE PRESENT INVENTION

Figure 2:
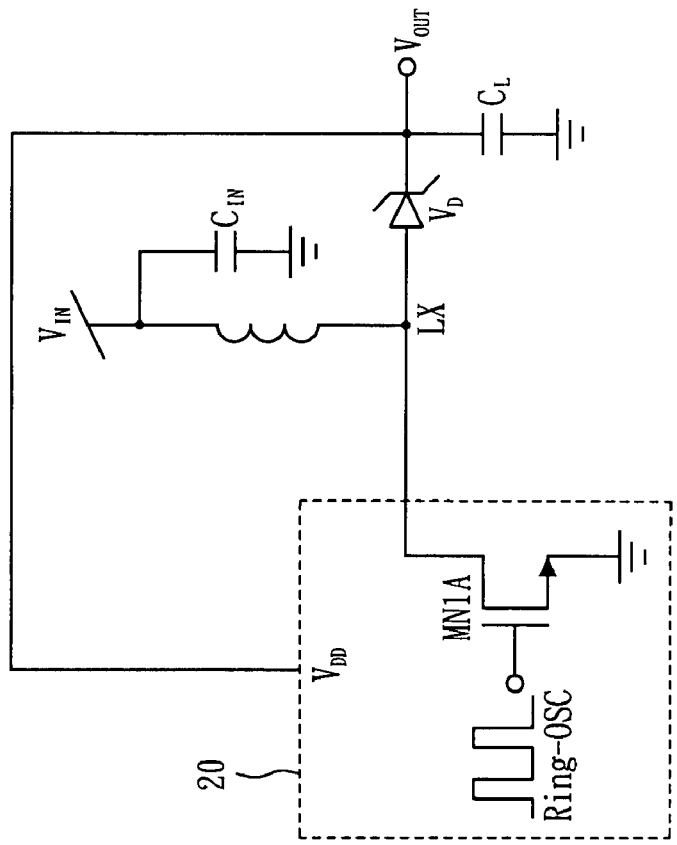
FIG. 2 shows another prior circuit for starting up a step-up DC/DC converter.
Figure 1:
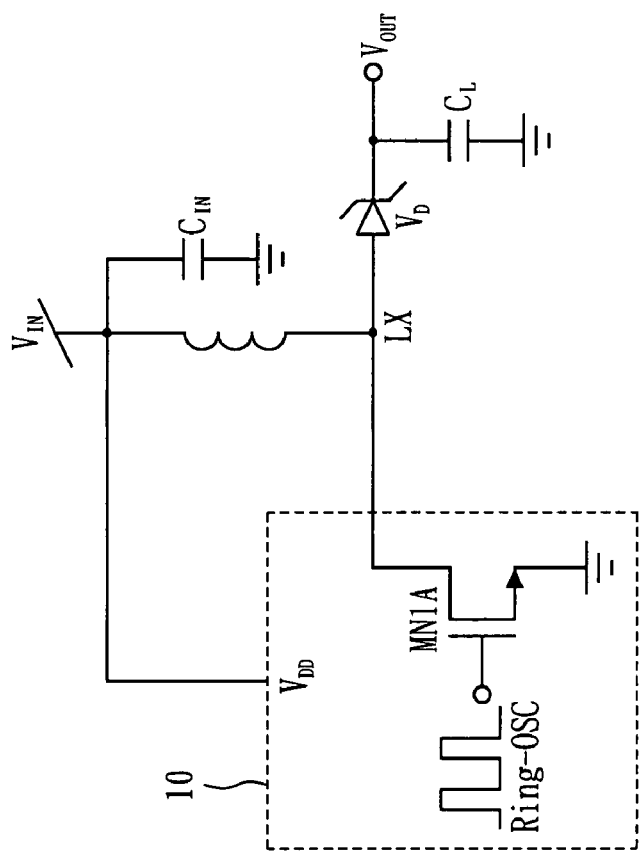
FIG. 1 shows a prior art circuit for starting up a step-up DC/DC converter.
Figure 3:
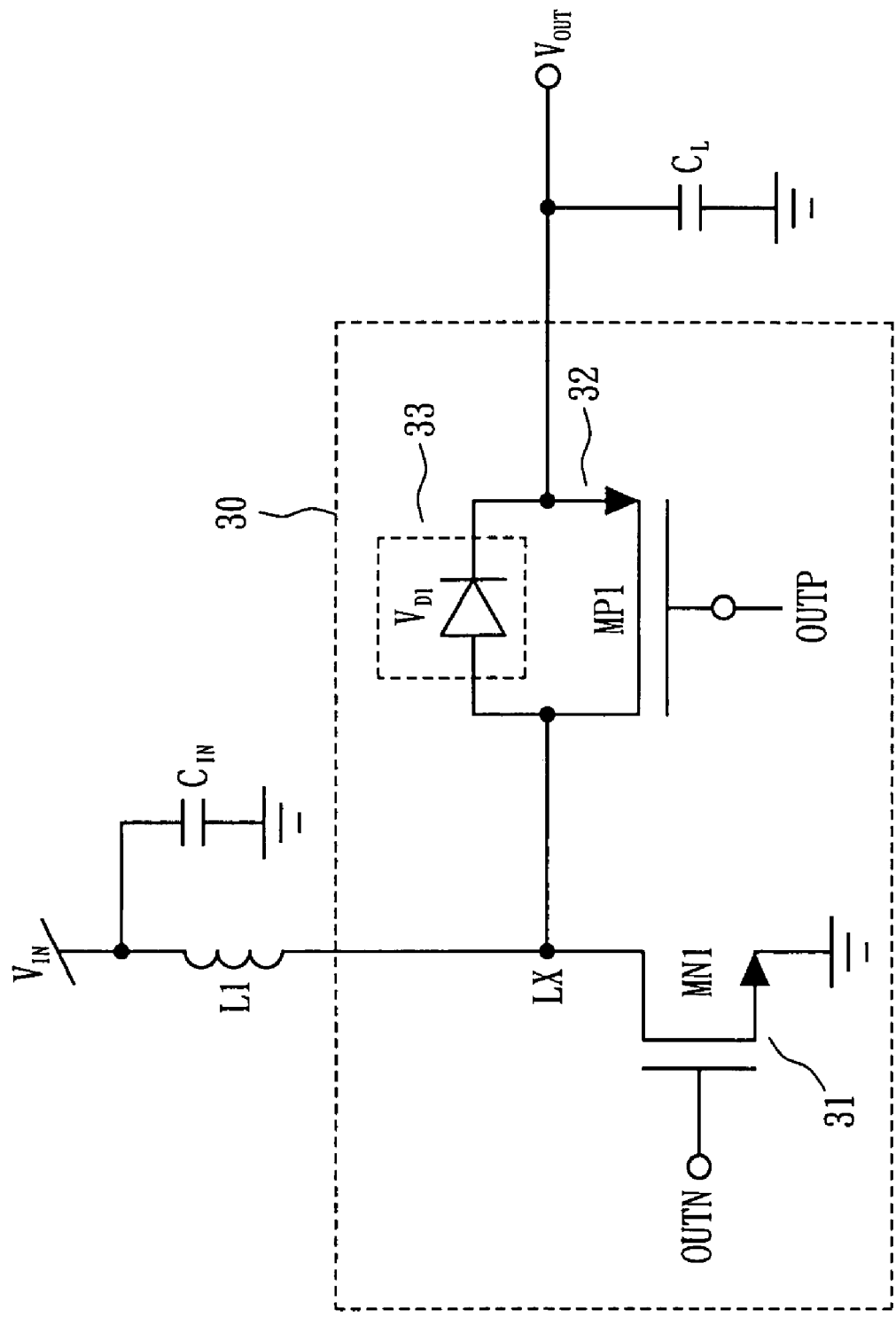
FIG. 3 shows a prior synchronous circuit for starting up a step-up DC/DC converter.
Figure 4:
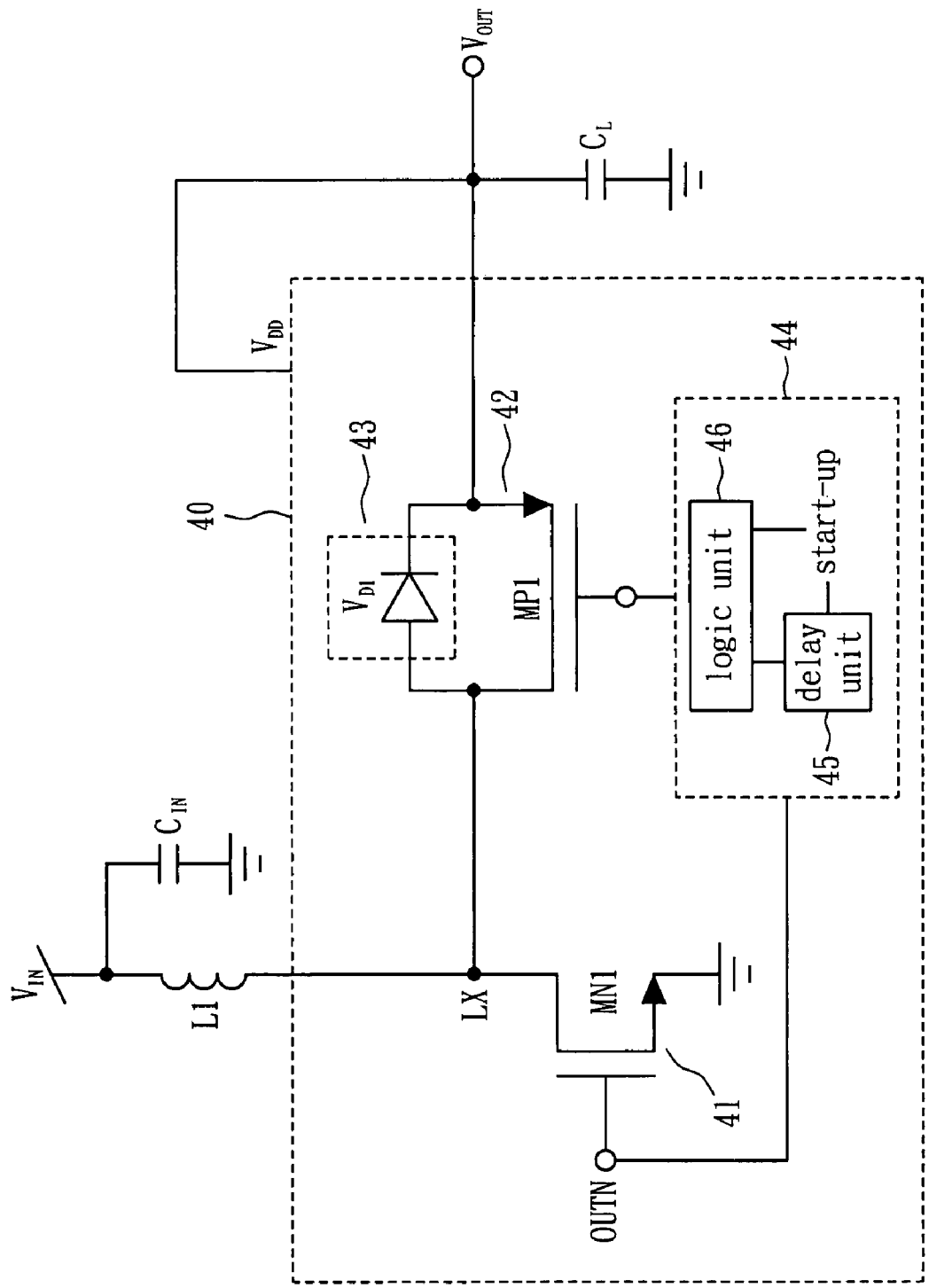
FIG. 4 shows a hint diagram of a circuit for starting up a synchronous step-up DC/DC converter according to one embodiment of the present invention.

FIG. 4 shows a hint diagram of a circuit for starting up a synchronous step-up DC/DC converter according to one embodiment of the present invention. The circuit 40 includes a P-type power transistor 42, an N-type power transistor 41 and a controller 44. The circuit 40 is powered by a voltage source $V_{IN}$ through an inductor L1. The P-type power transistor 42 includes a parasitic diode 43, one end of which connects to the output end $V_{OUT}$ of the synchronous step-up DC/DC converter, which acts as a power source for the start-up circuit 40 and an oscillator 51. As far as the parasitic diode 43 is concerned, the conductance voltage is usually set at 0.3 volt. One end LX of the N-type power transistor 41 connects to the P-type power transistor 42, and the other end is grounded. One end of the controller 44 electrically connects to the oscillator 51. The controller 44 includes a delay unit 45 and a logic unit 46, where the logic unit 46 disables the N-type power transistor 41 upon start-up and then enables the P-type power transistor 42, and the delay unit 45 disables the P-type power transistor 42 in a period after start-up and then enables the N-type power transistor 41.

Figures 5A, 5B:
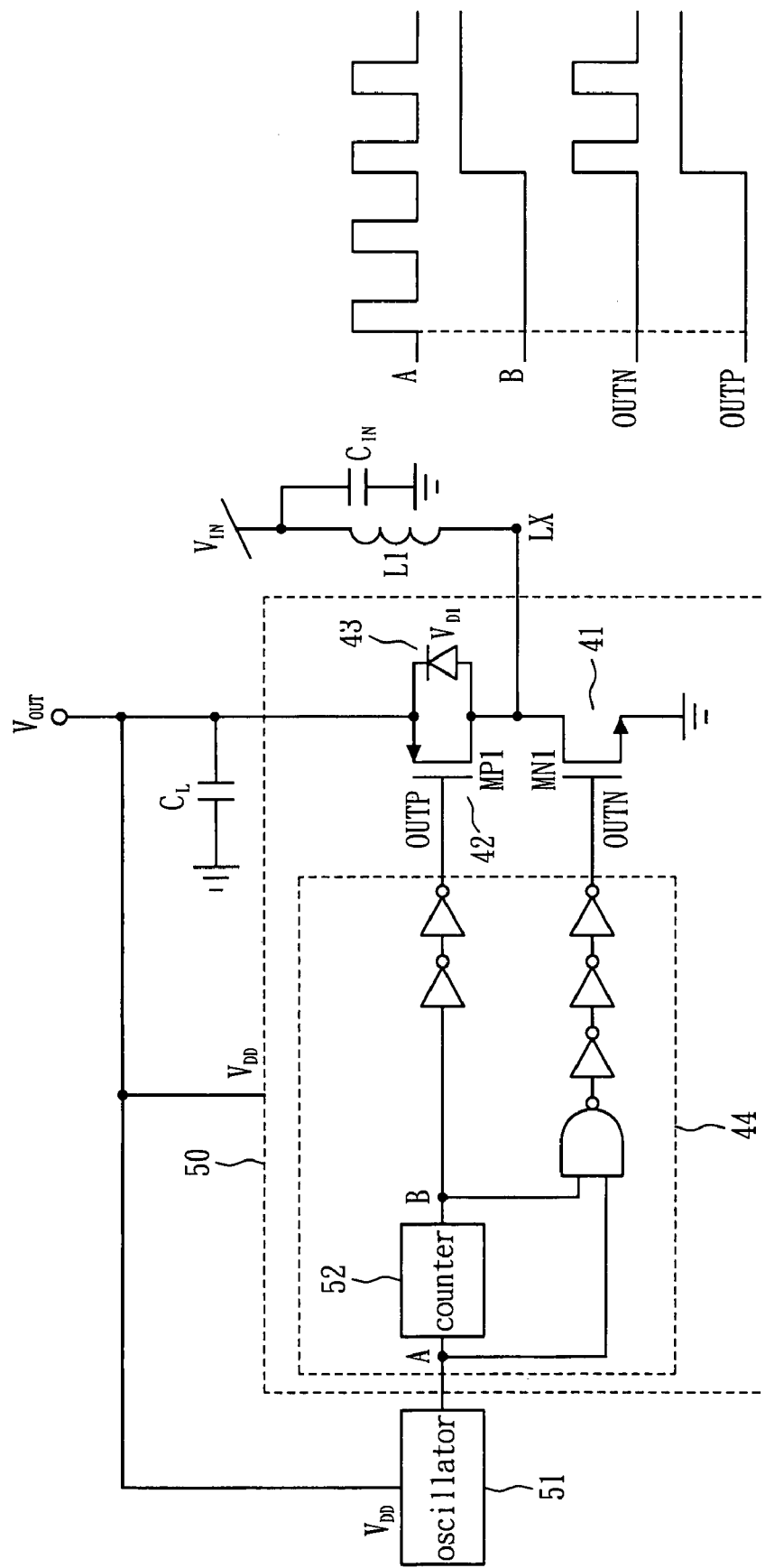
FIG. 5(a) shows a circuit for starting up a synchronous step-up DC/DC converter according to one embodiment of the present invention.
FIG. 5(b) shows a timing diagram corresponding to FIG. 5(a).

FIG. 5(a) shows a circuit for starting up a synchronous step-up DC/DC converter according to one embodiment of the present invention, while FIG. 5(b) is the timing diagram corresponding to FIG. 5(a). The controller 44 in FIG. 4 could be implemented by a counter 52 and a plurality of the logic gates. The counter 52 of this embodiment chooses 2 as its counting value, and changes its state at the same time as the pulse transition from a low state to a high state of oscillator 51. The oscillator 51 and counter 52 both output low voltage when the output voltage has not reached the start-up voltage of the oscillator. Therefore upon start-up, the N-type power transistor 41 is disabled and then the P-type power transistor 42 is enabled. By means of the conductance of the P-type power transistor 42, the voltage source $V_{IN}$ can directly provide the analog IC with the power source. For example, when voltage source $V_{IN}$ is 0.9 volt, even after deducting the source-drain voltage drop of the P-type power transistor 42, the output end $V_{OUT}$ can still stay at 0.75 volt, which is enough to enable the oscillator 51 to generate oscillator pulses. The counter 52 connects to the oscillator 51. After the oscillator 51 is enabled to generate two pulses, the output B of the counter 52 changes state by following the pulse transition from low to high of the oscillator pulses. The output transition of the counter 52 first disables the P-type power transistor 42 and then enables the N-type power transistor 41. It is noteworthy that the inductor L1 is an energy-storing element, which stores energy during the counting period of the counter 52, in order to ensure the circuit has enough energy to push the oscillator 51 to keep operating in a stable state before signals are sent to the output end. Also, the voltage source $V_{IN}$ is still rising at that time; therefore, even though the P-type power transistor 42 is disabled, by means of the conductance of the parasitic diode 43, the output end $V_{OUT}$ can stay at 0.75 volt after two pulses, even considering the 0.3 voltage drop of the parasitic diode, which is enough to force the oscillator 51 to operate in a normal condition. The method of the present invention is first to input a low voltage to the voltage source $V_{IN}$, which enables the oscillator 51 through the P-type power transistor 42. In a period after the start-up of the oscillator 51, such as one to four clock pulses, the P-type power transistor 42 is disabled first, and the N-type power transistor 41 is then enabled. Although the P-type power transistor 42 is disabled, through the conductance path of the parasitic diode 43 of the P-type power transistor 42, the voltage source $V_{IN}$ can still provide enough power energy to force the oscillator to operate in a normal condition. Meanwhile, the voltage source $V_{IN}$ is still rising, and by means of the energy-storing function of the inductor L1, the entire analog IC stays in a normal operation.

The present invention does not need a zenor diode used in prior circuits. In contrast, the present invention uses the parasitic diode 43 of the P-type power transistor 42 to achieve the purpose of the invention. Therefore, the present invention can save cost and reduce chip area. In addition, the present invention uses the non-overlapping design of synchronous circuits, which satisfies the current design trend.

The above-described embodiments of the present invention are intended to be illustrative only. Numerous alternative embodiments may be devised by persons skilled in the art without departing from the scope of the following claims.

What is claimed is:

1. A circuit for starting up a synchronous step-up DC/DC converter, the circuit connected to a voltage source through an inductor and comprising:

a P-type power transistor including a parasitic diode, one end of the P-type power transistor providing an oscillator with power;

an N-type power transistor connected to the P-type power transistor; and a controller electrically connected to the oscillator, the controller including a delay unit and a logic unit, wherein the logic unit disables the N-type power transistor and enables the P-type power transistor upon start-up, and the delay unit disables the P-type power transistor and enables the N-type power transistor in a period after start-up.

2. The circuit for starting up a synchronous step-up DC/DC converter of claim 1, wherein the delay unit includes a counter connected to the gate of the P-type power transistor.

3. The circuit for starting up a synchronous step-up DC/DC converter of claim 2, wherein the counter changes its state at the same time as the pulse transition from a low state to a high state of the oscillator.

4. The circuit for starting up a synchronous step-up DC/DC converter of claim 2, wherein the counter changes its state after counting 1 to 4 pulses.

5. A circuit for starting up a synchronous step-up DC/DC converter, the circuit connected to a voltage source through an inductor and comprising:

a P-type power transistor including a parasitic diode, one end of the P-type power transistor providing an oscillator with power;

an N-type power transistor connected to the P-type power transistor, wherein the P-type and N-type power transistors are enabled separately at non-overlapping times; and a controller electrically connected to the oscillator, the controller enabling the P-type power transistor upon start-up and enabling the N-type power transistor in a period after start-up.

6. The circuit for starting up a synchronous step-up DC/DC converter of claim 5, wherein the controller includes a counter connected to the gate of the P-type power transistor.

7. The circuit for starting up a synchronous step-up DC/DC converter of claim 6, wherein the counter changes its state at the same time as the pulse transition from a low state to a high state of the oscillator.

8. The circuit for starting up a synchronous step-up DC/DC converter of claim 6, wherein the counter changes its state after counting 1 to 4 pulses.

9. A method for starting up a synchronous step-up DC/DC converter, comprising the steps of:

providing a P-type and N-type power transistor connected to each other, the P-type and N-type power transistors connected to a voltage source through an inductor, and one end of the P-type power transistor providing an oscillator with power;

inputting a low start-up voltage to the voltage source to enable the oscillator through the P-type power transistor; and disabling the P-type power transistor first and then enabling the N-type power transistor after the oscillator has operated for a period.

10. The method of claim 9, further comprising the step of using a counter to calculate the time to disable the P-type power transistor.

11. The method of claim 10, wherein the counter changes its state at the same time as the pulse transition from a low state to a high state of the oscillator.

* * * * *